United States Patent [19]
Fergerson et al.

[11] Patent Number: 5,966,697
[45] Date of Patent: Oct. 12, 1999

[54] SYSTEM AND METHOD FOR SECURE TRANSACTION ORDER MANAGEMENT PROCESSING

[75] Inventors: Julie S. Fergerson, Austin; Christopher L. Fowler, Round Rock; Risser C. Estes, Austin, all of Tex.

[73] Assignee: ClearCommerce Corporation, Austin, Tex.

[21] Appl. No.: 08/960,970

[22] Filed: Oct. 30, 1997

[51] Int. Cl.[6] .................................................. G06F 15/20
[52] U.S. Cl. ............................ 705/26; 705/21; 705/27; 235/375
[58] Field of Search .............................. 705/21, 26, 27; 235/375, 385; 186/61; 711/209

[56] References Cited

U.S. PATENT DOCUMENTS

| | | | |
|---|---|---|---|
| 5,319,758 | 6/1994 | Arai et al. ................................. | 711/209 |
| 5,434,394 | 7/1995 | Roach et al. ............................. | 235/375 |
| 5,752,582 | 5/1998 | Hayward .................................... | 186/61 |

FOREIGN PATENT DOCUMENTS

| | | | |
|---|---|---|---|
| 10105829 | 9/1996 | Japan .............................. | G07F 17/40 |

OTHER PUBLICATIONS

Studio Archetype develops innovative on-line shopping site for Time Warner, Business Wire, Sanfracisco, Oct. 29, 1996.

*Primary Examiner*—Allen R. MacDonald
*Assistant Examiner*—M. Irshadullah
*Attorney, Agent, or Firm*—Skjerven, Morrill, MacPherson, Franklin & Friel, LLP; Joseph T. Van Leeuwen

[57] ABSTRACT

A system and method for shopping at a variety of different vendors easily and securely is disclosed. A user computer, a checkout processor, and one or more merchant computers are interconnected via a network. A user first selects a merchant and receives product information from the merchant. The user may select products from the merchant along with options for the selected items. When the user is finished shopping at a particular merchant, the user may select another merchant or checkout. At any time during the shopping or during checkout, the user may modify items previously selected by the user. When the user requests to checkout, product selection data is transferred to a secure central checkout processor and the checkout processor obtains order information from the user, performs review order processing, and then processes the order.

60 Claims, 18 Drawing Sheets

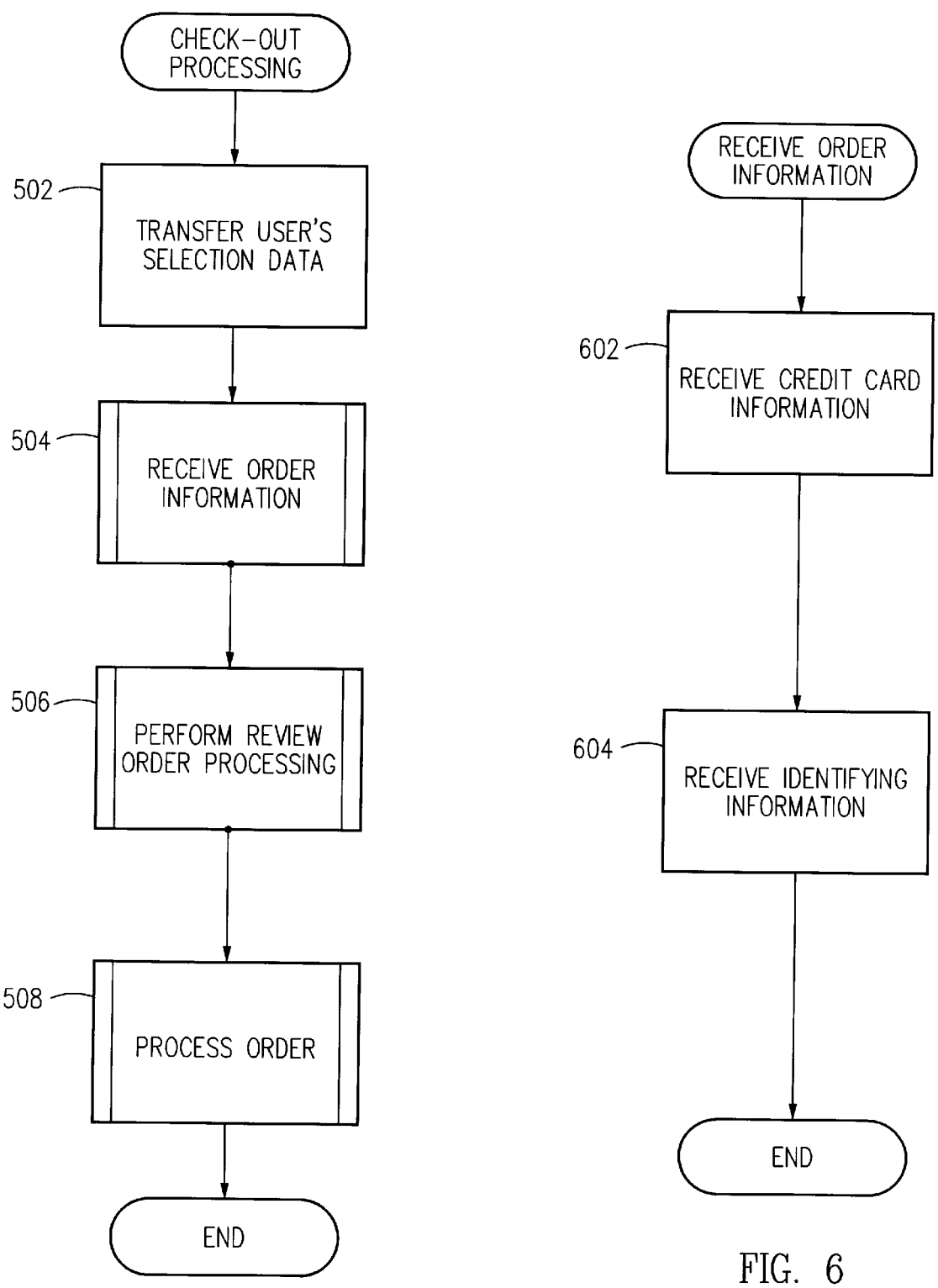

Demo Store for X=Mall

On-line Ordering is Quick & Easy!

Just select the items you want below. Enter your credit card information on a secure web page, and your order will be on its way!

| Item Description | Price | Add Item |
|---|---|---|
| "Fermat's Last Theorem"<br>Fermat's Last Theorem: Unlocking the Secret of an Ancient Mathematical Problem Amir D. Aczel | $12.60 | 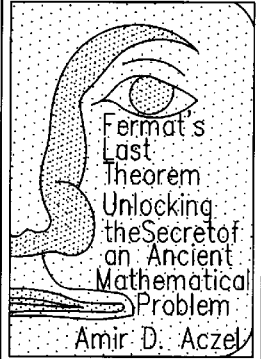 |

[ Finished Shopping ]

The fine print

FIG. 9A

Demo Store for X=Mall

| | | | Test Store #2 | | | |
|---|---|---|---|---|---|---|
| Remove | Code | Qty | Description | Options | Price@ | Amount |
| ☐ | 1568580770 | 1 | Fermat's Last Theorem | | 12.60 | 12.60 |
| | | | | | Subtotal: | 12.60 |
| | | | | | Total: | 12.60 |

Make sure you use Refresh Options if you make changes.

[ Save Changes ]  [ Empty Cart ]  [ Continue Shopping ]  [ Order Now ]

FIG. 9B

Demo Store for X=Mall

On-line Ordering is Quick & Easy!

Just select the items you want below. Enter your credit card information on a secure web page, and your order will be on its way!

| Item Description | Price | Add Item |
|---|---|---|
| "Fermat's Last Theorem" Fermat's Last Theorem: Unlocking the Secret of an Ancient Mathematical Problem Amir D. Aczel | $12.60 | 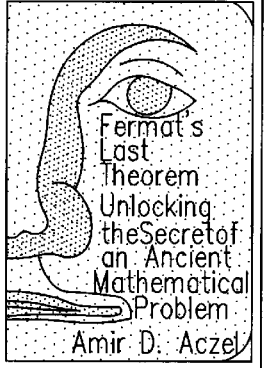 |

[Finished Shopping]

The fine print

FIG. 9C

Demo Store for X=Mall

On-line Ordering is Quick & Easy!

Just select the items you want below. Enter your credit card information on a secure web page, and your order will be on its way!

| Item Description | Price | Add Item |
|---|---|---|
| "White Diamonds by Elizabeth Taylor"<br><br>Introduced in 1991 by famous celebrity, Elizabeth Taylor. White Diamonds once again shows her exceptional sense of style. This sophisticated floral has notes of Italian neroli, living Amazon lily, Egyptian tuberose, Turkish rose, Italian orris, living narcissus, living jasmine, Italian sandalwood, patchouli, amber, and oakmoss. The brilliant bottles of the spray are columnar with a ring of rhinestones, while the perfume bottle is oval with stunning rhinestone bow.<br><br>• Sophisticated, Floral<br>• Perfect for all occasions | $33.60 | |

( Finished Shopping )

The fine print

FIG. 9D

Demo Store for X=Mall

Test Store #1

| Remove | Code | Qty | Description | Options | Price@ | Amount |
|---|---|---|---|---|---|---|
| ☐ | F9455020 | 1 | 1.7 oz Eau de Toilette Spray | | 33.60 | 33.60 |

Test Store #2

| Remove | Code | Qty | Description | Options | Price@ | Amount |
|---|---|---|---|---|---|---|
| ☐ | 1568580770 | 1 | Fermat's Last Theorem | | 12.60 | 12.60 |
| | | | | | Subtotal: | 46.20 |
| | | | | | Total: | 46.20 |

Make sure you use Refresh Options if you make changes.

( Save Changes )  ( Empty Cart )  ( Continue Shopping )  ( Order Now )

FIG. 9E

Demo Store for X=Mall

Test Store #1

| Qty | Code | Description | Options | Price@ | Amount |
|---|---|---|---|---|---|
| 1 | F9455020 | 1.7 oz Eau de Toilette Spray | | 33.60 | 33.60 |

Test Store #2

| Qty | Code | Description | Options | Price@ | Amount |
|---|---|---|---|---|---|
| 1 | 1568580770 | Fermat's Last Theorem | | 12.60 | 12.60 |
| | | | | Subtotal: | 46.20 |

Sold To

Name: Julie Fergerons

Address 1: 9101 Burnet Road

Address 2: Suite 207

City: Austin    Zip: 78758

State:
- Alabama
- Alaska
- Arizona
- Arkansas
- California

Country:
- United States
- Afghanistan
- Albania
- Algeria
- American Samoa

Ship To (If different)

Name:

Address 1:

Address 2:

City:    Zip:

State:
- Alabama
- Alaska
- Arizona
- Arkansas
- California

Country:
- United States
- Afghanistan
- Albania
- Algeria
- American Samoa

FIG. 9F

| Daytime Phone: | (512) 832-0132 |
| E-Mail Address: | julief@outreach.com |
| Credit Card Expiration Date: | 01 / 02 / 03    1996 / 1997 / 1998 |
| Credit Card Number: | 4005550000000019 |
| Fax Number (optional): | |
| Company Name (optional): | |

How did you hear about us?

[ Review Order ]

We accept:

FIG. 9F CONT.

Demo!

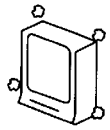

Here is a sample of a commercial web site demonstrating delivery of both hard good and soft goods:

This demo is not a real transaction. Your credit card will not be charged. If you prefer, you can enter a fake credit card number, perhaps a string of zeros, to test the transaction.

| Item Description | Price | Add Item |
|---|---|---|
| "I SURF THE WEB" T-SHIRT<br><br>Make your friends jealous when you sport this really cool, "I surf the WEB" tee. SM/MED/LG/XL; RED, GREEN, BLUE | $12.95 | |

Item

| Item Description | Price | Add Item |
|---|---|---|
| Blast'em Game Software<br><br>Purchase on-line and download this great shoot'em up video game! | $39.95 | |

Item

| Item Description | Price | Add Item |
|---|---|---|
| 8mm Computer Data Cartridge | $See Options | |

Home Page|ShowCase| Rates & Services |About Us|CommerceLink(tm)|WebHelp|Feedback Toll Free: 888-280-9999 International: 512-832-0132

The Fine Print

FIG. 10A

| Remove | Code | Qty | Description | Options | Price@ | Amount |
|---|---|---|---|---|---|---|
| ☐ | 10 | 1 | I Surf the Web T-Shirt | Small ▽ / Red ▽ | 12.95 | 12.95 |
| | | | | | Subtotal: | 12.95 |

Please be sure to Save Changes if you make changes.

( Save Changes ) ( Empty Cart ) ( Continue Shopping ) ( Order Now )

FIG. 10B

| Remove | Code | Qty | Description | Options | Price@ | Amount |
|---|---|---|---|---|---|---|
| ☐ | 10001 | 1 | 8mm Computer Data Cartridges | 90M ▽ | 60.00 | 60.00 |
| ☐ | 10 | 1 | I Surf the Web T-Shirt | Small ▽ / Red ▽ | 12.95 | 12.95 |
| | | | | | Subtotal: | 72.95 |

Please be sure to Save Changes if you make changes.

( Save Changes ) ( Empty Cart ) ( Continue Shopping ) ( Order Now )

FIG. 10D

 Demo!

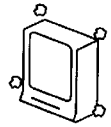

Here is a sample of a commercial web site demonstrating delivery of both hard good and soft goods:

This demo is not a real transaction. Your credit card will not be charged. If you prefer, you can enter a fake credit card number, perhaps a string of zeros, to test the transaction.

| Item Description | Price | Add Item |
|---|---|---|
| "I SURF THE WEB" T-SHIRT<br><br>Make your friends jealous when you sport this really cool, "I surf the WEB" tee. SM/MED/LG/XL; RED, GREEN, BLUE | $12.95 | |

Item

| Item Description | Price | Add Item |
|---|---|---|
| Blast'em Game Software<br><br>Purchase on-line and download this great shoot'em up video game! | $39.95 | |

Item

| Item Description | Price | Add Item |
|---|---|---|
| 8mm Computer Data Cartridge | $See Options | |

Home Page|ShowCase| Rates & Services |About Us|CommerceLink(tm)|WebHelp|Feedback Toll Free: 888-280-9999  International: 512-832-0132

The Fine Print

FIG. 10C

Red

| Qty | Code | Description | Options | Price@ | Amount |
|---|---|---|---|---|---|
| 1 | 10001 | 8mm Computer Data Cartridges | 90M | 60.00 | 60.00 |
| 1 | 10 | I Surf the Web T-Shirt | Small | 12.95 | 12.95 |
| | | | | Subtotal: | 72.95 |

Required Fields

Name: Joe Q. Public

E-Mail Address: joe@aol.com

Credit Card Number: 1111111111111111

Credit Card Expiration Date: 01 / 1997
02   1998
03   1999

The State field is not required if you are outside the US. In this event, please select your country in the country selection under Billing Address.

State: Alabama
Alaska
Arizona
Arkansas
California

Zip/Postal Code: 78701

If any of the ordered products must be shipped, you must fill in the Additional Information section.

FIG. 10E

| | Additional Information | |
|---|---|---|
| | Billing Address | Shipping Address (If |
| Company Name: | Joe's Place | |
| Street Address: | 111 Oak Drive | |
| Apartment or Suite #: | | |
| City: | Austin | |
| State: | Same As Above | Alabama<br>Alaska<br>Arizona<br>Arkansas<br>California |
| Zip/Postal Code: | Same As Above | |
| Country: | United States<br>Afghanistan<br>Albania<br>Algeria<br>American Samoa | United States<br>Afghanistan<br>Albania<br>Algeria<br>American Samoa |
| Non-US State/Province: | | |
| Daytime Phone: | | |
| Fax Number: | | |

How did you hear about us?

Comments

Review Order

We accept: VISA  MASTERCARD  AMERICAN EXPRESS  DISCOVER

FIG. 10E CONT.

SYSTEM AND METHOD FOR SECURE TRANSACTION ORDER MANAGEMENT PROCESSING

FIELD OF THE INVENTION

The present invention relates to the field of information handling systems, and more particularly to a system and method to allow a user to purchase items from multiple vendors within a computer network.

BACKGROUND OF THE INVENTION

In an information handling system, electronic shopping on a global computer network such as the Internet can be frustrating and time consuming. While analysts expect shopping on global computer networks to increase dramatically over the next few years, the popularity of "cyber-shopping " will remain low if a few significant problems are not solved. Specifically, consumers spend too much time searching for items and currently have difficulty conducting comparisons between competing items at different merchants. Consumers are also presented with a checkout screen by each merchant where they purchase items. This requires the user to enter essentially the same information over and over again. Finally, users have little confidence that the security of their sensitive financial data, such as credit card numbers, will be maintained by each and every merchant web site. Some merchants may be sophisticated and utilize security means to protect data while others are simply trying to keep up with their competitors and want a "web presence " without fully understanding the security issues involved.

One of the major problems with the prior art is that users are frustrated with the time it takes to go shopping on the Internet. Much of the consumption of time stems from the fact that each conventional virtual store is typically designed like a traditional paper-based catalogue. Each virtual store typically has a way for customers to browse for items, select items they wish to purchase, and checkout using a credit card. Conventionally, the user is forced to go to each specific store and do the same set of activities over and over again. When the user wishes to checkout, he or she is typically shown a checkout screen requiring the user to fill in their name, address, phone number(s), electronic mail (e-mail) address, credit card information, and other information that the merchant may require. As there are no standards yet in place on the Internet, each merchant's checkout screen typically varies considerably from other merchants'checkout screens. This causes the user additional confusion and frustration.

Another problem with conventional virtual stores is that it is difficult for the user to comparison shop. If the user finds a better deal at a second store they may have already purchased the item at the first store. At that point, it is usually too late to return the first item. The user will have to wait until the item arrives and return the item if the merchant allows for such returns. To avoid this problem, the user must typically make two shopping trips. The first trip is needed to browse through available merchandise without making any selections or purchasing any items. The user typically has to make notes throughout their browsing trip as to which merchant offers the best terms based upon the user's personal shopping preferences. These preferences include price, quality, shipping terms, return policies, and other criteria which users utilize to make shopping selections. The second trip is needed to go back to the stores with the best deals in terms of the user's preferences and complete the purchase. The user completes the purchase by finding the items and merchants identified during their browsing trip, selecting those items on the selection screen provided by each merchant, and completing the checkout screen for each merchant.

A third problem with the prior art is security. Each merchant sets up its virtual store differently. Since shoppers at virtual stores typically purchase items using a credit card, this sensitive financial information may be able to be seen by would be thieves and computer hackers if the merchant's site is not secured using encryption and other forms of data security. Distrust over the security of the merchant's payment system often causes shoppers to look elsewhere even though the merchant has better quality or prices.

SUMMARY

The present invention provides a system and method for shopping at a variety of different vendors easily and securely. A user first chooses to shop at a particular merchant. The user receives product information from the merchant's computer which is in turn displayed on the user's computer. The user may select an item for purchase from the displayed product information. For example, the user may select a sweater from a merchant and may be able to select the color and the size of the sweater. Additional pricing information may also be attached to an option, so an extra large sweater may cost more than a regular sweater.

After the user selects an item, the item and all of the options for the item are stored in a memory (referred to herein as shopping selection data, product selection data, or selection data) which may be stored on the merchant's computer. When the user is done shopping at a particular merchant (or is done searching for a particular item from a plurality of merchants), the user has a choice of either shopping at a different merchant or checking out. Assuming that the user chooses to shop at a different merchant, the user's selection data is transferred to and stored in the next merchant's computer. At any time, the user may choose to see, edit and delete items previously selected regardless of which merchant computer the user is currently accessing. This process continues until the user requests to checkout.

When the user requests to checkout, the selection data that has been gathered throughout the user's shopping session is transferred and stored on a secured computer that performs the checkout processing. The user may enter their name, billing address, and other identifying information along with their credit card information for the credit card they choose to use to make all the purchases. Once this information has been entered, the checkout processing computer uses the user's identifying information and credit card information to perform multiple credit card transactions with one transaction for each merchant from whom the user selected items. The checkout processor also determines what, if any, extra fees such as sales tax and shipping expenses are to be added to the order. The credit card is authorized for each sale separately and the user and the merchant receive receipts for the purchase via electronic mail.

Some goods, such as software, may be transmitted to the user via the computer network on which the user is shopping. In this situation, the goods may be transmitted to the user immediately following the successful transaction.

BRIEF DESCRIPTION OF THE DRAWINGS

FIG. 5 is a flow chart illustrating a method of enabling a user to checkout at a merchant according to one embodiment of the present invention;

FIG. 6 is a flow chart illustrating a method of receiving order information according to one embodiment of the present invention;

FIGS. 9A through 9F are sample screens of one embodiment of the present invention.

FIGS. 10A through 10E are sample screens of an alternative embodiment of the present invention.

DETAILED DESCRIPTION OF A PREFERRED EMBODIMENT OF THE INVENTION

Figure 1:
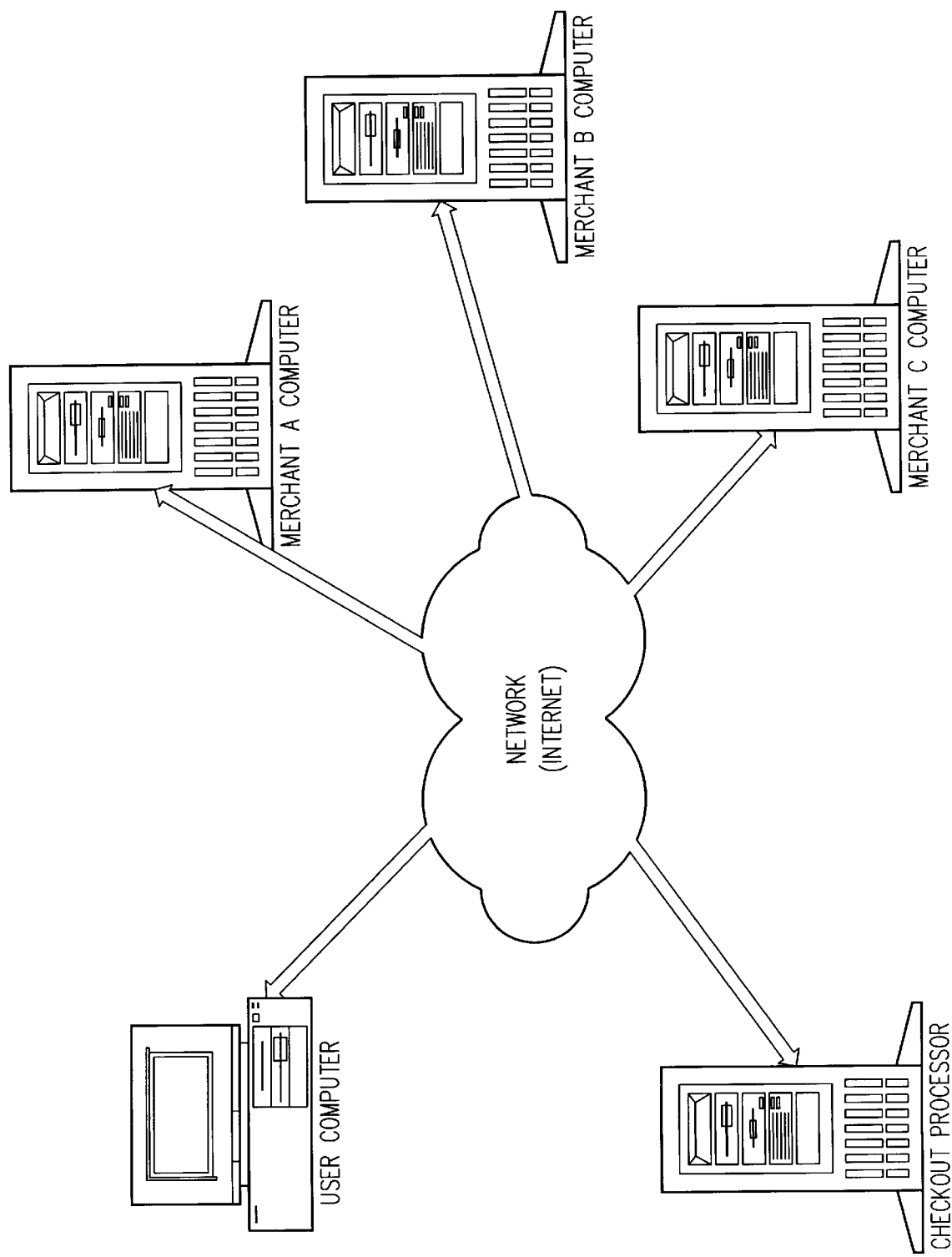
FIG. 1 is a diagram of a computer network interconnecting a plurality of merchant computers, a user computer, and a checkout processor according to one embodiment of the present invention.

FIG. 1 illustrates a computer network that interconnects a user computer, one or more merchants and a checkout processor. In the illustrated embodiment, the network interconnects the user computer and checkout processor to three merchant computers. In other embodiments, any number of merchant computers may be interconnected to a user computer and checkout processor via the network. In one particular embodiment, the network interconnecting the merchant computers to the user computer and checkout processor is the Internet.

Each computer and processor in FIG. 1 includes an interface circuit for interconnecting to the network. In one embodiment, each computer includes a modem which facilitates the transfer of data between the computers via telephone lines. In alternative embodiments, the computers may interface to other computers which interface directly with the network. In other embodiments, the computers may be directly wired to the network.

The merchant computers may include memory storage areas for storing product data and user selection data. The user computer may include a memory storage area for storing product data downloaded from a merchant computer and a memory storage area for storing user selection data. The checkout processor may include a memory storage area for storing user selection data.

In one embodiment, a software program controls the storage of data and the transfer of data between the merchant computers, the user computer and the checkout processor. One example of a software program that controls the storage and transfer of data is NetMarketPlace™ by Outreach, Inc. The software program may include a tool to build and design the individual merchant virtual stores to insure compatibility with the other virtual stores and the checkout processor.

Figure 2:
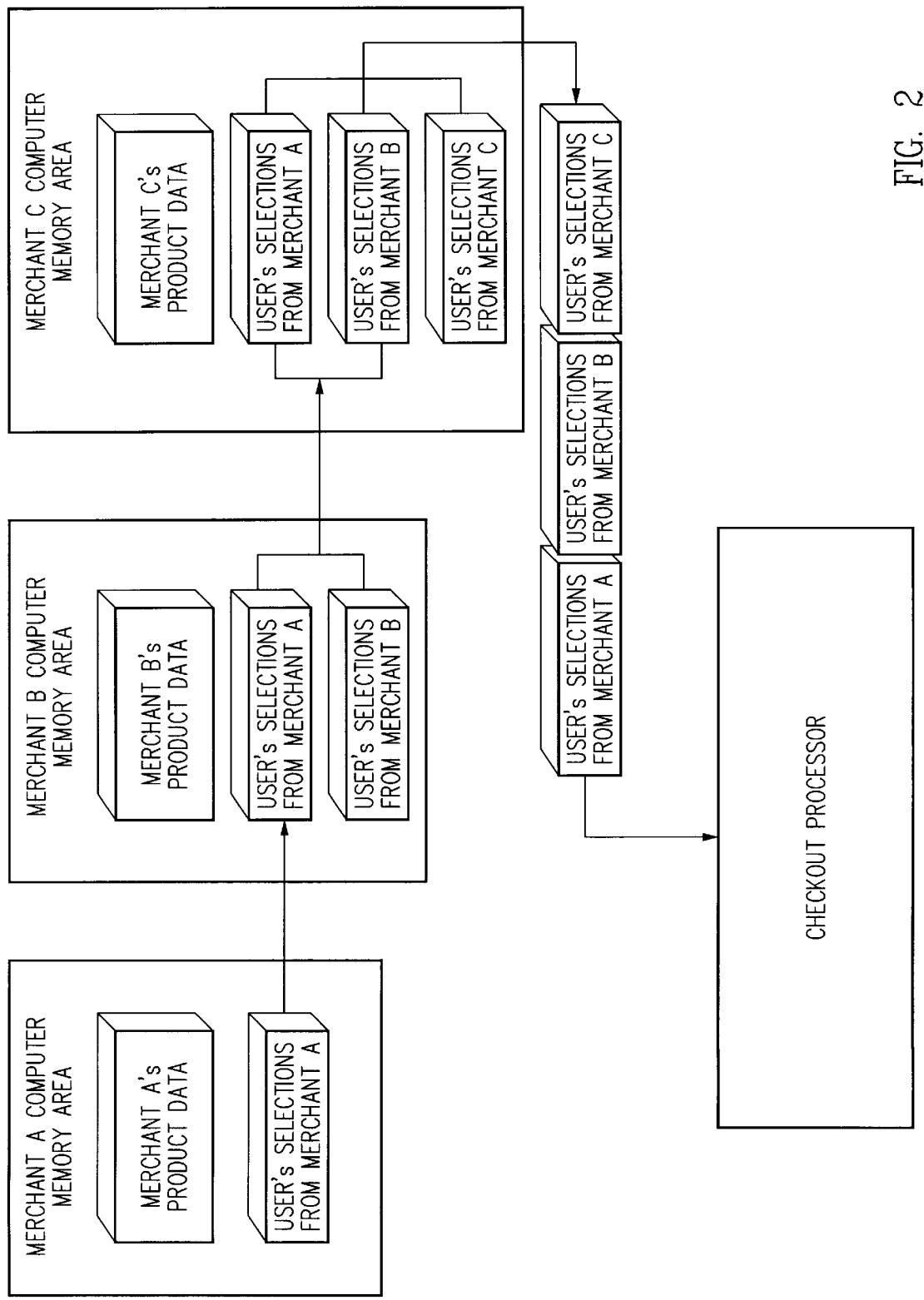
FIG. 2 is a diagram illustrating data stored in the memory area of a plurality of merchant computers and the flow of data between the merchant computers and a checkout processor according to one embodiment of the present invention.

Turning now to FIG. 2, a diagram illustrating the data stored in the memory of the merchant computers is shown.

In the illustrated embodiment, merchant A' computer includes a memory storage area for storing product data. In one embodiment, product data is data that identifies the products merchant A is offering for sale from its virtual store. For example, product data may include pictures of the products, descriptions of the products, various options available (such as sizes and color), the prices of the products and shipping information. As discussed below in more detail, the product data may be downloaded via the network to a user computer where the user can view the product data and select products to purchase based upon the product data.

The merchant A computer illustrated in FIG. 2 also includes a memory storage area for storing data indicative of the products selected by a user (i.e. selection data). For example, information identifying products selected by the user such as a product number and desired options may be stored in the merchant A computer. In alternative embodiments, the selection data may be stored in the user computer or the checkout processor.

The merchant B computer also includes a memory area which may store product data and user selection data. As discussed above, product data includes data which identifies products the merchant is offering for sale. In the illustrated embodiment, the merchant B computer also includes a memory area for storing selection data from other merchants. In the illustrated embodiment, the merchant B computer stores data identifying products selected by the user from merchant A. In the illustrated embodiment, the selection data from merchant A is transferred from the merchant A computer to the merchant B computer. Because the merchant B computer has access to the selection data from both merchants A and B, the user can modify the selections made from either merchant while shopping at merchant B's virtual store. For example, if the user selects a blue sweater from merchant A, the selection data identifying the sweater from merchant A is transferred to the merchant B computer. If the user finds an alternative blue sweater, which the user prefers, at merchant B, the user can select the sweater from merchant B and remove the sweater from merchant A from his shopping section data without returning to merchant A. Alternatively, the user could change his selection from merchant A while shopping at merchant B. For example, the user could change his color selection of the sweater selected from merchant A when the latter blue sweater is selected from merchant B. Because the selection data is not processed until the user has completed shopping at all the merchants which the user desires, the user is able to modify the selection data at any time during a shopping session.

As discussed above, in an alternative embodiment, the user's selection data may be stored in a user computer or checkout processor. In this embodiment, the user may likewise modify selection data at any time during the shopping session. For example, if the user's selection data is stored in a user computer, the user has access to the selection data from both merchants A and B. Accordingly, the selection data from merchant A can be modified while the user is currently shopping at merchant B.

In a similar manner to the merchant A computer and the merchant B computer discussed above, the merchant C computer includes a memory area for storing product data and user selection data. In one embodiment, the merchant C computer stores the user selection data from the previous merchants accessed by the user. In the illustrated embodiment, the merchant C computer receives selection data from the merchant A computer and the merchant B computer. Accordingly, the merchant C computer has the selection data from all previous merchants and the user can modify the selection data from previous merchants while shopping at merchant C.

When the user desires to checkout, i.e., purchase the items selected, the user's selection data is transferred from the last merchant to the checkout processor. In an alternative embodiment in which the users selection data is stored in the checkout processor, the need for transferring the selection data to the checkout processor is obviated. In the alternative embodiment in which the selection data is stored in the user computer, the selection data is transferred from the user computer to the checkout processor when checkout is desired. The details of checkout processing are discussed below in more detail.

The checkout processor is a secure transaction order management processor. An example of a software program for providing secure transactions is STOMP™ which is produced by Outreach, Inc. The checkout processor is a secure central processor for checking out users. By using one secure central checkout processor, the individual merchants do not need to be concerned about secured transactions. Additionally, the user is assured of the same level of security regardless of from which merchants the user purchases products.

TABLE 1

| | |
|---|---|
| 1 | merchant count |
| m | merchant delimiter |
| 998 | id |
| Tupperwave | name |
| TX, AL, GA | states |
| 0.00 | tax amount |
| flat | shipping type |
| 2.00 | shipping definition |
| i | item delimiter |
| 1000 | id |
| 1 | number (for item count) |
| CrystalWave Small Set | name |
| 4.00 | price |
| 2.00 | weight |
| 1 | quantity |
| 2 | softgood type |
| — | softgood filename data |
| — | softgood key generation data |
| images/1000 jpg | graphic |
| 2.00 | shipping price |
| 0 | nontaxable check |
| o | option delimiter |
| Color | name |
| 1 | choice |
| c | choice delimiter |
| Red | name |
| 1001 | item id modifier |
| 1.00 | item price modifier |
| — | item softgood modifier |
| — | item softgood filename modifier |
| — | item softgood keygen modifier |
| Blue | name |
| 1002 | item id modifier |
| −1.00 | item price modifier |
| — | item softgood modifier |
| — | item softgood filename modifier |
| — | item softgood keygen modifier |
| o | option delimiter |
| Size | name |
| 2 | choice |
| c | choice delimiter |
| Large | name |
| — | item id modifier |
| 2.00 | item price modifier |
| — | item softgood modifier |
| — | item softgood filename modifier |
| — | item softgood keygen modifier |
| Small | name |
| — | item id modifier |

TABLE 1-continued

| | |
|---|---|
| −2.00 | item price modifier |
| — | item softgood modifier |
| — | item softgood filename modifier |
| — | item softgood keygen modifier |

Table 1 shows an example of user selection data according to one embodiment of the present invention. As discussed above, the user selection data stores information regarding products selected for purchase by a user. The user selection data includes a plurality of fields where each field specifies a pertinent piece of data within the user selection data. Example values for each field and a brief description of each field are shown in Table 1 and discussed below.

The first field within the user selection data specifies the merchant count. The merchant count indicates the number of merchants from which the user has selected data. If additional merchants are added to the selection data, the merchant count is increased to reflect the number of merchants and each merchant is delineated by a merchant delimiter. The second field in the user selection data is the merchant delimiter "m". Above, each merchant within the user selection data is delimited by the merchant delimiter. The merchant ID field specifies an identification number for the merchant. The state field lists each state in which sales tax is charged on purchases made from within that state. The tax amount field indicates the amount of sales tax for each state listed in the state field. The shipping type field identifies how shipping costs are calculated. For example, shipping costs may be a flat rate based upon the number of items purchased or shipping costs may be determined by the weight of the product shipped or the distanced the products are shipped. In the illustrated example, a flat rate for each item is specified. The shipping definition field specifies additional information related to the shipping type field. In the illustrated example, the shipping definition field indicates that the flat rate per item for shipping is $2.00 per item.

The item delimiter field deliminates items purchased from a merchant. In the illustrated example, only one item is shown. If multiple items were purchased from one merchant, the same information separated by an item delimiter would be appended to the end of the user data. The ID field identifies and identification number for the item purchased. The item number field identifies the number of the item specified in the field. If multiple items were purchased from one merchant, the subsequent items in the selection data would have numbers specifying each item number. The name field specifies the name of the item. The price and weight field specify the price in dollars and the weight in pounds of the item. The quantity field specifies the number of items purchased by the user. The soft good type field is used when soft goods are purchased. As discussed above, soft goods are items that may be transferred to the user via the network on which the user is shopping. If the item is a soft good, the soft good type field is used to identify the type of soft good, such as a computer program to be transferred to a user or a key to be generated for the user. The file name field specifies the path and file name of software to be transferred to a user. The soft good key generation field specifies a computer program to generate a key or authorization code. In the illustrated example, the purchased good is not a soft good so the soft good fields are not utilized. The graphic field specifies the path and file name of a graphics file. The graphics file may be a picture of the item. The non-taxable check field may be used to override the shipping information specified for a merchant. For example, if a product is particularly large or heavy, the product may have a special shipping price. The non-taxable check field is typically zero or one and specifies whether the particular item is subject to tax.

The option delimiter field is used to delimit the options for an item. The name field indicates the name of the option. In the illustrated embodiment, the first option is color. The choice field specifies which of the option choices the user has selected. In the illustrated example, the user has selected the first choice of the available options which is the color red.

The choice delimiter delimits the available choices for an option. The name field specifies the name of the choice. In the illustrated example, the first choice for the color option is red. The item ID modifier field specifies a modified identification number based upon the option. In the illustrated example, item number 1000 is changed to 1001 when the color red is selected. The item price modifier specifies any price difference for the option. The item price modifier field may be positive or negative. In the illustrated example, the item in the color red is an additional dollar. Accordingly, the additional dollar will be added to the original price or $4.00 when the option red is selected. The item soft good modifier, the item soft good file name modifier and the item soft good keygen modifier allow the soft good type, file name and key generation program to be modified based upon a selected option. Because the item selected in the illustrated example is not a soft good, these fields are not used in this example. The name field identifies the second choice within the option of color. The second choice is the color blue. In a similar manner to that discussed above in reference the color red, the item identification modifier specifies the item identification number if the item is selected. The item price modifier specifies the difference in price if that option is selected. In the illustrated example, the price modifier indicates that the price of the item is reduced by one dollar when the blue option is selected. The soft good fields are again not used.

The option deliminator field indicates that a second option is available for the selected item. The name field indicates that the second option is size. The choice field indicates that the user has selected the second choice for the size option. The choice deliminator field delimits the choices within the size option. The name field indicates that the first choice is large. The choice of size does not affect the identification number, thus the item identification modifier field is not used. The item price modifier field indicates that the item costs $2.00 more when a large size is selected. The soft good modifier fields are not used. The name field indicates that the second size choice is small. Again, the item ID modifier field is not used. The item price modifier indicates that the price of the item is $2.00 less when the small size is selected. Soft good modifiers are again not used. As can be seen from table one, the selection data includes sufficient information to identify the products selected by a user, to calculate the total charges for an item, and to allow a user to modify the selection data at a later point within the shopping session. As noted above, additional merchants or additional items from the same merchant may be added to the user selection data illustrated in Table 1.

Figure 3:
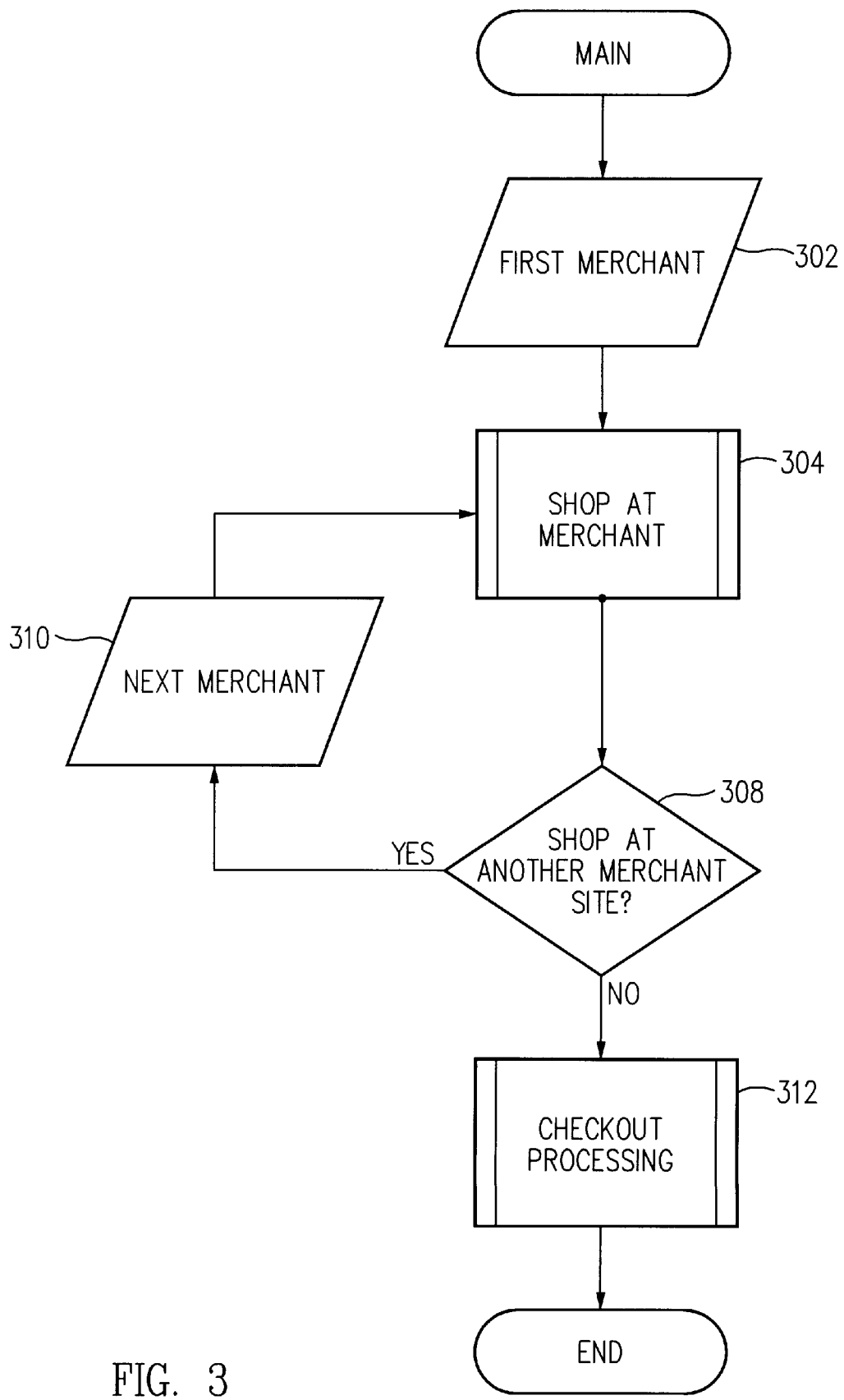
FIG. 3 is a flow chart illustrating a method for conducting electronic commerce on a computer network according to one embodiment of the present invention.

Turning now to FIG. 3, a flow chart illustrating a method of conducting electronic commerce in a computer network is shown. In step 302, the user selects a first merchant at which to shop. In one embodiment, the user may select a merchant from a plurality of merchants that are part of a shopping network. A conventional means of displaying and selecting data of a computer may be used to select a merchant. For example, a list of merchants may be displayed by the user computer and the user may select a merchant by pointing and clicking on the desired merchant using a mouse device. A parameter is set to indicate that the selected merchant is the first merchant selected during this shopping session.

In step 304, the user shops at the merchant selected in step 302. In this step, product data is transferred to and displayed by a user computer, and products and options related to those products may be selected. The details of a user shopping at a particular merchant are discussed in more detail below with reference to FIG. 4. After a user has finished shopping at the first merchant, in decisional step 308, it is determined whether the user desires to shop at another merchant or checkout. If the user desires to shop at another merchant, then in step 310, the user selects the next merchant at which to shop and a parameter is set to indicate that the merchant is not the first merchant. After the user selects the next merchant, the user shops at the selected merchant in step 304. Steps 308, 310 and 304 are repeated until the user decides to checkout.

If in step 308, the user selects checkout rather than a next merchant, then in step 312, the user's selection data is transferred to the checkout processor and the user's order is processed. Checkout processing is disclosed in more detail below with reference to FIGS. 5 through 8. After checkout processing, the user's shopping session is complete.

Figure 4:
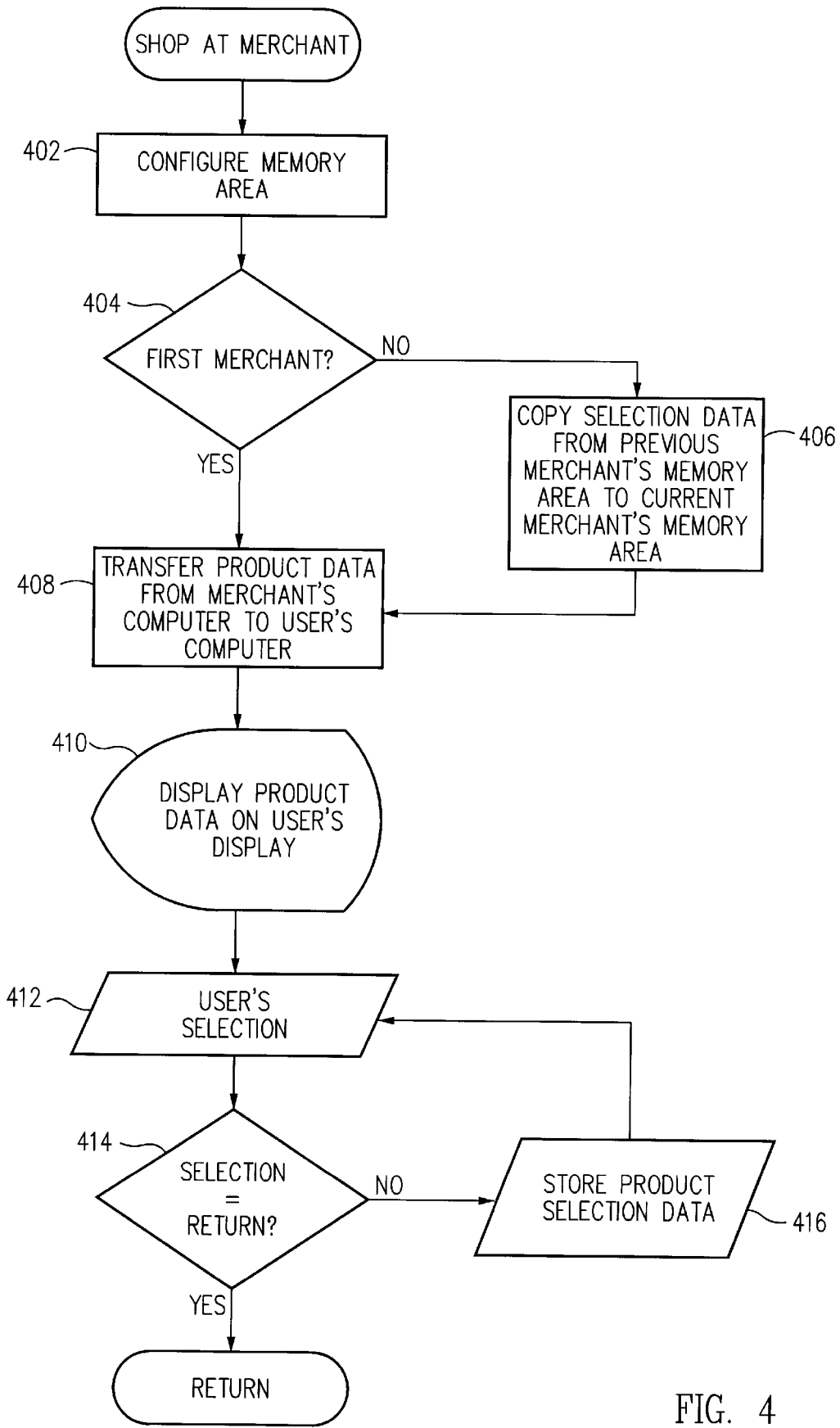
FIG. 4 is a flow chart illustrating a method of enabling a user to shop at a merchant according to one embodiment of the present invention.

Turning now to FIG. 4, a flow chart illustrating a method for enabling a user to shop at a merchant is shown. In step 402, a memory area is configured for storing user selection data. In one embodiment, the memory is configured in the merchant's computer. In alternative embodiments, the memory area may be configured in the user's computer or the checkout processor. In decisional step 404, it is determined whether the current merchant is the first merchant accessed during this shopping session. In one embodiment, if the current merchant is not the first merchant, then in step 406, selection data from the previous merchant's memory is copied to the current merchant's memory area and operation continues at step 408. If in decisional step 404, it is determined that the current merchant is the first merchant, then step 406 is not performed and operation continues at step 408.

In step 408, the current merchant's product data is transferred from the merchant computer to the user computer. As discussed above, the merchant's product data includes data which identifies the products offered for sale by the merchant. For example, the product data may include pictures of the items offered for sale, a description of the items offered for sale and the prices of the items offered for sale. The product data may additionally include information about the products available from the merchant such as applicable taxes, shipping costs and shipping times. Additionally, the product data may include information for selecting options related to a product. For example, the product data may include options for selecting color, size, extras available with an item, etc.

In step 410, the product data transferred in step 408 is displayed on the user computer. In some embodiments, the product selection data may include more data than can be displayed at one time on the user computer. In this embodiment, a portion of the product data is displayed at any one time. The user may select other portions of the product data to be displayed. For example, the user may scroll through the product data or the product data may include menus to select portions of the product data to be displayed.

In step 412, the user selects products which the user desires to purchase. The user may select products by any conventional means of selecting or identifying information via a computer. For example, the user may select a product by pointing and clicking a mouse device on a picture or description of the product, or the user may type in a product number for the desired product. Depending upon the product selected by the user, the user may be required to select additional information about the product. For example, the user may be required to select a size and/or color of a product. Additionally the user may make other selections such as options available with the product.

In step 412, one option that the user may select is an option to end the shopping session with the first merchant and return to the main shopping program. Returning to the main shopping program, allows the user to select a different merchant site or to checkout. In decisional step 414, it is determined whether the user selected this return option. If the user did select the return option, then in step 416 the user is returned to the main shopping program described above in reference to FIG. 3. Alternatively, if the user did not select the return option, then in step 416 the user selection data is stored in the memory area configured in step 406. Execution continues at step 412 where the user may select another product or select a return to the main program. Steps 414 and 416 and 412 are repeated until the user decides to return to the main shopping program.

Turning now to FIG. 5, a block diagram illustrating a method of checkout processing is shown. In step 502, a user's selection data is transferred to a checkout processor. As discussed above, in one embodiment the selection data is transferred from the last merchant computer to the checkout processor. In another embodiment, the selection data is transferred from the user computer to the checkout processor. In still another embodiment, the selection data already resides in the checkout processor and the data may be transferred from one memory area to another.

In step 504, order information is received from the user. The order information may include credit card and identification information. The receiving of order information is discussed in more detail below in reference to FIG. 6. In step 506, review order processing is performed. Review order processing allows the user an additional opportunity to modify the selection data. The user may modify the order or may delete items in the shopping selection data. Review order processing is discussed in more detail below with reference to FIG. 7. In step 508, the user's order is processed. Processing the order may entail performing a credit card transaction, notifying each merchant of the products selected by the user and providing the user with one or more receipts of the transactions. Processing the order is discussed in more detail below with reference to FIG. 8.

Turning now to FIG. 6, a method for receiving order information according to one embodiment of the present invention is shown. In step 602, credit card information from the user is received. The credit card information may include a type of credit card (e.g., Master Card®, Visa®, American Express®, Discover®), a credit card account number, the credit card expiration date, and the user's name as it appears on the credit card. In step 604, information identifying the user may be obtained. Information identifying the user may include the user's name, the user's billing address, the shipping address for this order, and/or the user's phone number.

Figure 7:
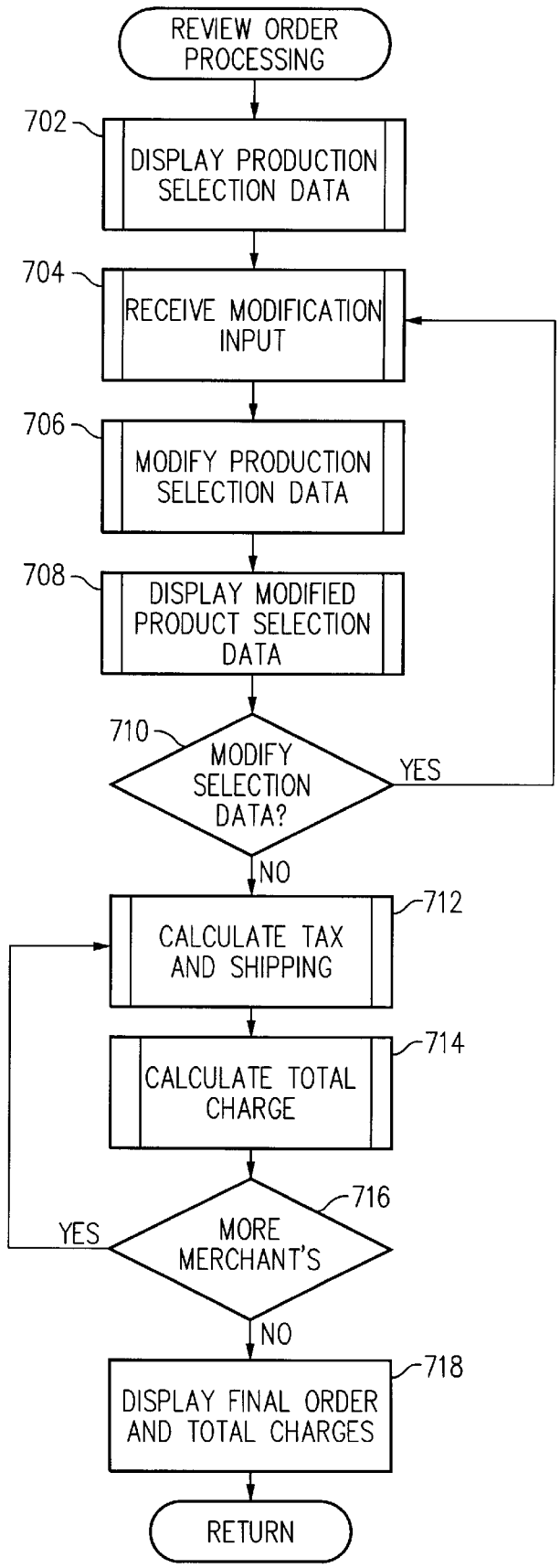
FIG. 7 is a flow chart illustrating a method of review order processing according to one embodiment of the present invention.

Turning now to FIG. 7, a method for review order processing according to one embodiment of the present invention is shown. Review order processing allows the user to modify the items selected for purchase. Additionally, review processing may include calculating the total charges for products selected. As discussed above, the user may modify the selection data while shopping at any merchant. Review order processing provides an additional opportunity for the user to modify the selection data during checkout. In step 702, the items selected for purchase by the user is displayed for the user to review. The display may include pictures of the items selected, descriptions of the items selected, product numbers of the items selected, prices of the items selected, any options selected by the user, and/or any options related to the product not selected by the user.

In step 704 modification input is received. The modification input allows the user to modify the selection data. After reviewing the items displayed in step 702, the user may delete an item previously selected from the shopping selection data, or change a parameter of an item previously selected, e.g., select a different size or color.

In step 706, the user selection data is modified in accordance with the modification input received in step 704. In step 708, the modified selection data is displayed. In decisional step 710, the user is queried whether any additional modifications are desired. If additional modifications are desired, steps 704, 706, 708, and 710 are repeated until the user has entered all desired modifications to the selection data.

When the user has finished modifying the selection data, the total charge for each merchant is determined. In step 712, the tax and shipping charges for a first merchant are calculated. In step 714, the total charge for a first merchant is calculated. The total charge may include the cost for each item selected, the cost of any options selected, the tax on the selected items and options, and any applicable shipping charges. In step 716, it is determined whether the total charge for all merchants has been calculated. If additional merchants need to be calculated, steps 712, 714, and 716 are repeated until the total charges for each merchant from which the user has selected products has been calculated.

In step 718, the user's final order is displayed. The user's final order may include information about all products purchased, tax and shipping for each merchant, total charges for each merchant, and the total for all products purchased from all merchants. In step 720, the user is given an additional opportunity to modify the selections made. If the user desires to make modifications, the user returns to step 704.

Figure 8:
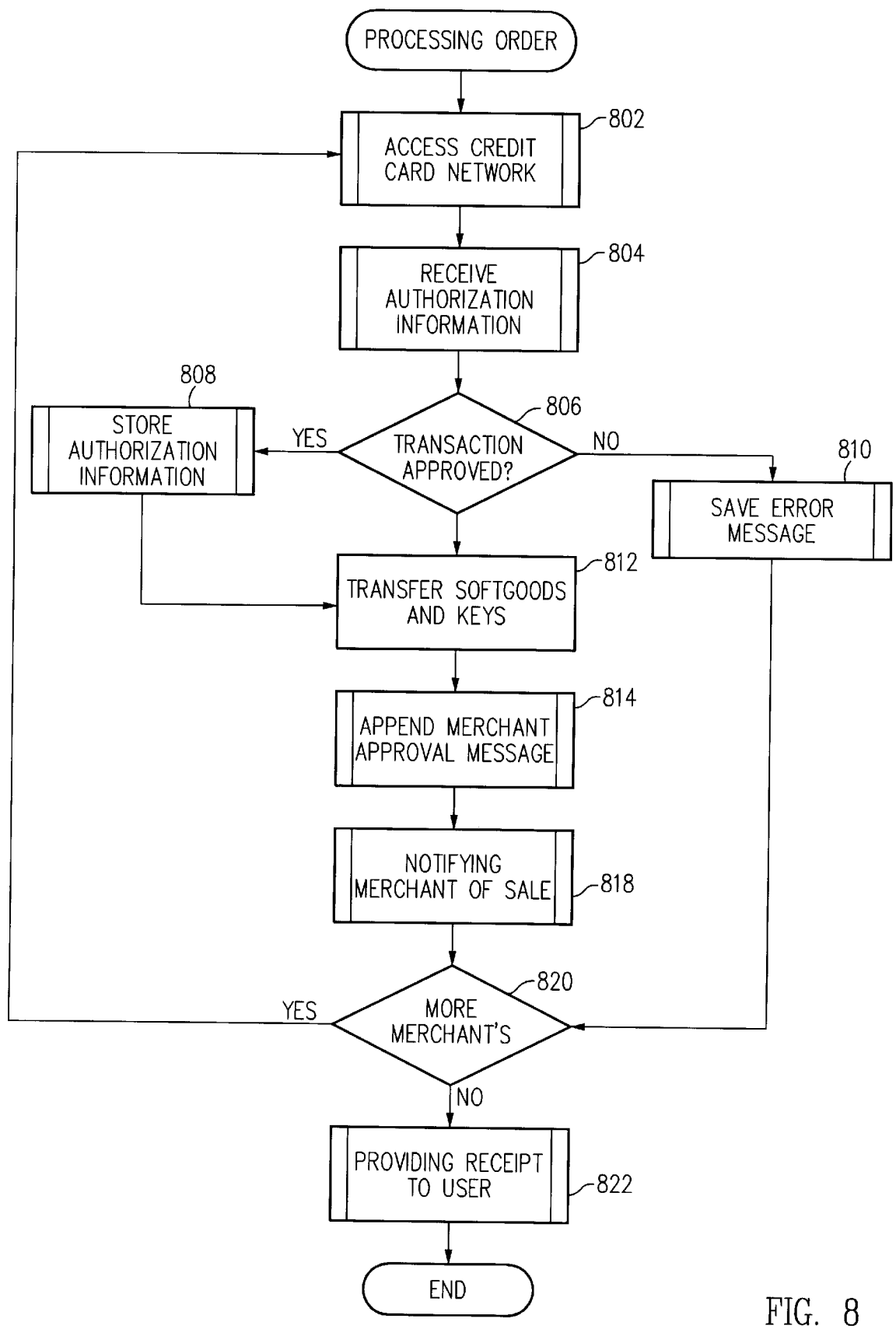
FIG. 8 is a flow chart illustrating a method of processing an order according to one embodiment of the present invention.

Turning now to FIG. 8, a method for processing an order according to one embodiment of the present invention is shown. In step 802, a credit card network is accessed to perform a credit card transaction. Any conventional means of accessing a credit card network to conduct a credit card transaction is contemplated. In step 804, authorization information is received from the credit card network. In decisional step 806, it is determined whether the credit card transaction was approved. If the credit card transaction was not approved, then, in step 810, an error message is saved and execution continues at step 822.

If the credit card transaction was approved, then in step 808 the authorization information is saved and, in step 814, any soft goods or keys are transferred to the user. Soft goods are any goods that may be electronically transferred to the user. Computer programs may be examples of soft goods. Rather than sending the user diskettes or a CD-rom, the merchant may electronically transfer the purchased soft goods to the user via the network on which the user is shopping. Keys are authorization codes that permit the user to access something that is already available to the user. For example, the user may already have a demonstration version of a software program that allows total access to the software when an appropriate authorization code is entered, or the user may purchase a subscription to an on-line publication that requires an authorization code. In either of the above cases, the authorization code can be transferred to the user via the network on which the user is shopping.

In step 816, a merchant approved message is sent to the user. For example, the merchant approved message may thank the user for shopping a merchant's virtual store or provide other information which may be useful to the user in regard to future shopping with the merchant.

In step 818, the merchant is notified of the sale, the selected products, and billing information such as the credit card company, the transaction number, and the authorization number. The information may be provided to the merchant by any conventional means such as electronic mail or postal mail.

In step 820, the user is provided a receipt that may indicate the products purchased, the price of each product, shipping and taxes, the total for each merchant, and the grand total of all purchases. The receipt may be provided to the user by any conventional means such as electronic mail or postal mail.

In step 822, it is determined whether the transactions with all merchants have been completed. If not all merchant transactions are completed, steps 802–820 are repeated until all merchant transactions are completed. When all merchant transactions are completed, the shopping session is complete. A final display screen may be shown to the user and the order may be written to an order data base for future reference.

In FIGS. 9A through 9F, printouts of example display screens of a computer program to allow users to purchase items via a computer network are shown. The example demonstrates shopping from two merchants, however the same screens may be used for shopping from more merchants. FIG. 9A is an example of a product display screen showing product information from a merchant. In FIG. 9A one product is displayed. The displayed product information includes the name of the product, a description of the product and the price of the product. As discussed above, additional product information may be displayed in other embodiments. In alternative embodiments, the price each item may not be shown on this display screen because the price may depend upon the options selected by the user. For example, the item in FIG. 9A describes a book. In alternative embodiments, the user may have a choice of book print styles to choose from in which a "large print" or audio version may be an available option but at different prices. A user may select an item by selecting "add item" next to the desired product. For example, if a user desires to purchase the item shown, a "Fermat's Last Theorem" book, the user would select "add item" next to the described product. Once an item is selected, the display screen shown in FIG. 9B is shown.

The selected display screen shown in FIG. 9B shows the item selected for purchase by a user. From this display screen, the user may select available options or select the quantity desired to be purchased. By selecting "remove" on the far left, the user may remove an item from the user's shopping selection data. Once the user has made the appropriate selections, the user has four choices identified by the four buttons at the bottom of the screen. The user may save the changes made, empty the shopping selection data, continue shopping or order now. Selecting "save changes" saves any changes made to the users selection. Selecting "empty cart" removes all the items selected by the user. Selecting "continue shopping" allows the user to return to the product display screen to select more items. Selecting "order now" is equivalent to selecting checkout.

If the user selects "continue shopping," the user returns to the product display screen as shown in FIG. 9C. At this point, the user may select additional items for purchase if other items are shown on the screen. When the user selects the shopping selection data icon, the user can choose a different merchant at which to view and purchase items as shown in FIG. 9D. In FIG. 9D, another merchant's products are displayed. In this case the merchant only has one item, perfume, "White Diamonds by Elizabeth Taylor," but in alternative embodiments multiple items may be displayed and viewed by the user The user may then select the item and review the order as shown in FIG. 9E. In FIG. 9E, the items selected from each merchant are displayed. Items selected from "Test Store #1" (the perfume) selected from FIG. 9D is displayed along with the items selected from "Test Store #2" (the book) selected from FIG. 9A. In an actual implementation the store names ("Test Store #1" and "Test Store #2") would reflect the actual merchant name rather than test names. In FIG. 9E, the user can modify options or remove items purchased at any of the stores from which they previously selected items. For example, even though the user is no longer visiting Test Store #2, the user could select "remove" next to "Fermat's Last Theorem" if the user no longer wishes to purchase it. The user can also modify other options, such as quantity, for any of the items shown in FIG. 9E. The user is also presented with a running total for all items selected during this shopping session, in this case the total is $46.20. At this point, the user may modify the selections, continue shopping or order the selected products. The user may select a different merchant by selecting "continue shopping" and then selecting the shopping selection data icon as shown in FIG. 9A. In an alternative embodiment, a selection button for "shop at a different merchant" may appear on FIG. 9E allowing the user to go directly to a different merchant rather than go back to the display of items at the current merchant. If the user selects a different merchant, a new product display screen is shown.

When the user wants to purchase or checkout the items selected, the user selects "order now." An order display screen shown in FIG. 9F is then displayed. In the illustrated embodiment, the order display screen includes three sections: a list of the selected products, required fields and additional information. The list of selected products displays the products selected by the user so that the user is sure of the exact selections entered by the user. The information displayed includes the quantity, code, description, options, unit price and total amount for each item selected. A subtotal is also displayed for the total of all the items selected at the various merchants. The required field section asks the user to enter pertinent information such as name, e-mail address, credit card number and credit card expiration date. This information may be used to perform a credit card transaction. The additional information section includes billing address, shipping address and telephone numbers. Additional fields are included to identify where the user heard about the electronic shopping system and user comments. When the user has finished entering the information on the order form, the user selects "review order." If any information is omitted or incorrect information is detected, the user will be prompted to re-enter the erroneous or omitted information. In an alternative embodiment, the user could also be allowed to remove items or modify options or quantity for any of the items displayed. The electronic shopping system then completes the transaction, notifies the merchant of the selected products and provides a receipt to the user.

In FIGS. 10A through 10E, printouts of more example display screens of a computer program to allow users to purchase items via a computer network are shown. This example demonstrates shopping from only one merchant, the same screens may be used for shopping from multiple merchants as were depicted in FIGS. 9A through 9F. FIG. 10A is an example of a product display screen showing product information from a merchant. In FIG. 10A three products are displayed. The displayed product information includes the name of the product, a description of the product and the price of the product. As discussed above, additional product information may be displayed in other embodiments. The price of the third item "8 mm computer data cartridge" is not shown on this display screen because the price depends upon the options selected by the user. In alternative embodiment, the price for each option may be shown on this display screen. A user may select an item by selecting "add item" next to the desired product. For example, if a user desires to purchase an "I surf the web" tee-shirt, the user would select "add item" next to the described product. Once an item is selected, the display screen shown in FIG. 10B is shown.

The selected display screen shown in FIG. 10B shows the item selected for purchase by a user. From this display screen, the user may select available options or select the quantity desired to be purchased. In the illustrated example, the user may select the size (small, medium, large or extra large) or color (red, green or blue) from the options field. By selecting "remove" on the far left, the user may remove an item from the user's shopping cart. Once the user has made the appropriate selections, the user has four choices identified by the four buttons at the bottom of the screen. The user may save the changes made, empty the shopping selection data, continue shopping or order now. Selecting "save changes" saves any changes made to the users selection. Selecting "empty cart" removes all the items selected by the user. Selecting "continue shopping" allows the user to return to the product display screen to select more items. Selecting "order now" is equivalent to selecting checkout.

If the user selects "continue shopping", the user returns to the product display screen as shown in FIG. 10C. At this point, the user may select additional items for purchase. For example, the user may select the "8 mm computer data cartridge" item by selecting "add item" adjacent to the item description and price. When the user selects "add item", the user returns to selection display screen as shown in FIG. 10D. In FIG. 10D, the data cartridge has been added to the user's shopping selection data. The user may then select the size of the data cartridge. For example, the data cartridge may come in 90M, 120M or 140M sizes. Once the user selects a size, the appropriate price is shown on the selection display screen. In the illustrated example, the 90M size data cartridge is priced at $60.00. At this point, the user may modify the selections, continue shopping or order the selected products. In another embodiment, such as the example in FIGS. 9A through 9F, the user may have an additional option of selecting a different merchant. If the user selects a different merchant, a new product display screen is shown. The items selected by the user would be transferred to the new merchant and the user may remove or modify the selected products from the first merchant while shopping at the second merchant.

When the user wants to purchase or checkout the items selected, the user selects "order now". An order display screen shown in FIG. 10E is then displayed. In the illustrated embodiment, the order display screen includes three sections: a list of the selected products, required fields and additional information. The list of selected products displays the products selected by the user so that the user is sure of the exact selections entered by the user. The required field section asks the user to enter pertinent information such as name, e-mail address, credit card number and credit card expiration date. This information may be used to perform a credit card transaction. The additional information section includes billing address, shipping address and telephone numbers. Additional fields are included to identify where the user heard about the electronic shopping system and user comments. When the user has finished entering the information on the order form, the user selects "review order". If any information is omitted or incorrect information is detected, the user will be prompted to re-enter the erroneous or omitted information. The electronic shopping system then completes the transaction, notifies the merchant of the selected products and provides a receipt to the user.

In an alternative embodiment, after the merchant is notified of the request to purchase one or more selected items an inventory control procedure is initiated by the merchant. For example, if the selected merchant is out of stock on a selected item, it can contact the user and inquire as to whether the user wishes to wait for the item or would like to cancel the item. This information is then conveyed to the system by the merchant and appropriate measures are taken with respect to charging the user's credit card account. If the user had selected $50 of merchandise from a merchant but only $30 of the merchandise was available, the user's credit card would only be charged for the items shipped by the merchant.

In an alternative implementation, the funds from credit card transactions are not released to the merchant until the selected items are actually shipped from the merchant. In addition, the amount of the charge in an alternative implementation can be forced to equal the amount of the merchandise (plus shipping charges and tax is applicable). The selected items stored on the transaction processing computer can then be modified or deleted to reflect shipments and cancellations.

What is claimed is:

1. A method for enabling a user to conduct electronic commerce in a computer network, wherein the user operates a computer system coupled to the computer network, wherein the computer system includes a display screen and a memory, wherein the method allows a customer to purchase items from a plurality of merchants with a single checkout operation, the method comprising:

(a) receiving input from the user which operates to select at least one selected merchant, wherein a merchant computer associated with the selected merchant is coupled to the computer network and includes a memory which stores product information;

(b) configuring a memory area in the merchant computer for storage of product selection data;

(c) transferring product information from the merchant computer to the user computer system;

(d) displaying said product information on the display screen of the user computer system, wherein said displaying is performed in response to said transferring said product information from the merchant computer to the user computer system;

(e) receiving input from the user to purchase one or more items from the selected merchant;

(f) storing product selection data in response to said input from the user, wherein said product selection data identifies said one or more items from the selected merchant;

(g) repeating (a) through (f) for a plurality of selected merchant computers until the user requests to checkout;

(h) receiving user input to checkout at a final merchant computer;

(i) transferring product selection data stored in repeated (f) for said plurality of selected merchant computers to the final merchant computer; and (j) performing checkout processing for items selected from said plurality of merchants at the final merchant computer.

2. The method of claim 1, wherein, during (g) of repeating (a) through (f) for a plurality of different merchants, said (b) of configuring said memory area in the merchant computer includes transferring product selection data from prior merchant computer to said configured memory area.

3. The method of claim 2, wherein for a present merchant computer being currently accessed by the user, said configuring said memory area in the present merchant computer includes transferring product selection data from a prior merchant computer to said configured memory area in the present merchant computer.

4. The method of claim 2, wherein (e) of storing the product selection data includes configuring a memory area in the merchant computer for storage of product selection data; wherein, each time (a) through (e) are repeated, said configuring said memory area in the merchant computer includes transferring product selection data from a prior merchant computer to said configured memory area.

5. The method of claim 4, wherein said transferring product selection data includes transferring product selection data from one or more prior merchant computers indicative of selected items from one or more prior merchants to said configured memory area.

6. The method of claim 2, wherein (f) includes transferring product selection data from a prior merchant computer to a merchant computer currently being accessed.

7. The method of claim 2, wherein said receiving input from the user which operates to select product information from at least one selected merchant comprises receiving input from the user which operates to select product information from a first selected merchant;

wherein, for said first selected merchant, said configuring said memory area in the merchant computer associated with said first merchant comprises allocating said memory area in the merchant computer associated with said first merchant;

wherein, during said repeating, said receiving input from the user which operates to select product information from at least one selected merchant comprises receiving input from the user which operates to select product information from a second selected merchant, wherein said second selected merchant is selected subsequent in time to said first selected merchant;

wherein, for said second selected merchant, said configuring said memory area in a respective merchant computer associated with said second selected merchant includes allocating said memory area in said respective merchant computer associated with said second selected merchant and transferring product selection data from he immediately prior merchant computer to said configured memory area.

8. The method of claim 1, further comprising:
wherein, during said repeating of (a) through (f) for a plurality of different merchants, said (b) of configuring said memory area in the merchant computer includes transferring product selection data from an immediately prior merchant computer to said configured memory area.

9. The method of claim 1, wherein said receiving input includes receiving input from the user which operates to select a web page of said at least one selected merchant;

wherein said transferring product information includes transferring said web page to the user computer system, wherein said web page includes said product information;

wherein said displaying includes displaying said web page.

10. The method of claim 1, wherein said receiving input from the user includes receiving input from the user which operates to select a search engine for searching for one or more products;

wherein the method further comprises the search engine obtaining product information from one or more merchant computers associated with one or more merchants;

wherein said transferring product information includes transferring said product information from said one or more merchant computers to the user computer system;

wherein said displaying product information includes displaying said product information from said one or more merchant computers.

11. The method of claim 10, wherein said search engine is operable for searching for one or more products from a plurality of different merchants.

12. The method of claim 1, wherein said performing checkout processing includes transferring said product selection data to a checkout processor computer system, wherein said checkout processor computer system is operable to perform checkout processing on said items selected from said plurality of different merchants.

13. The method of claim 12, wherein said plurality of different merchants includes a first merchant and a last merchant, wherein said transferring said product selection data to said checkout processor computer system comprises a merchant computer associated with said last merchant transferring said product selection data to said checkout processor computer system.

14. The method of claim 1, wherein said performing checkout processing includes:
receiving order information from the user;
performing review order processing for each of said plurality of different merchants; and processing the order for said plurality of different merchants.

15. The method of claim 14, wherein said performing review order processing comprises: p1 displaying said product selection data from said plurality of different merchants on said display screen of the user computer system;

receiving modification input from the user to modify said product selection data, wherein said modification input operates to modify the purchase of one or more items from said plurality of different merchants;

modifying said product selection data from said plurality of different vendors in response to receiving said modification input; and displaying the product selection data after said modifying.

16. The method of claim 15, wherein said performing review order processing further comprises:

calculating sales tax for each merchant indicated by said product selection data;

calculating shipping cost for each item indicated by said product selection data;

calculating a total charge for said items selected from said plurality of different merchants, wherein said total charge may include a cost for said items, said sales tax and said shipping costs;

displaying final order information on the display screen of the user computer system, wherein said final order information may include said product selection data, said sales tax, said shipping costs, a total for each merchant, and said total charge.

17. The method of claim 14, wherein said receiving order information from the user comprises:

receiving credit card information from the user; and receiving identifying information regarding the user.

18. The method of claim 14, wherein, for each of said plurality of different merchants, said processing the order comprises:

accessing a credit card network;

sending said credit card information to said credit card network;

receiving authorization information from said credit card network in response to said sending said credit card information;

determining if said order for a respective merchant is approved;

wherein said accessing, sending said credit card information, receiving authorization information, determining if said order for a respective merchant is approved, and said storing the authorization information are performed for each of said plurality of different merchants.

19. The method of claim 18, wherein said processing the order for said plurality of different merchants further comprises:

notifying said merchant of said product selection data; and providing a receipt to user.

20. The method of claim 18, wherein said receiving authorization information further comprises storing the authorization information.

21. A method for enabling a user to conduct electronic commerce in a computer network, wherein the user operates a computer system coupled to the computer network, wherein the computer system includes a display screen and a memory, wherein the method allows a customer to purchase items from a plurality of merchants with a single checkout operation, the method comprising:

(a) receiving input from the user which operates to select product information from at least one selected merchant, wherein a merchant computer associated with the selected merchant is coupled to the computer network and includes a memory which stores product information;

(b) transferring said product information from the merchant computer to the user computer system;

(c) displaying said product information on the display screen of the user computer system, wherein said displaying is performed in response to said transferring said product information from the merchant computer to the user computer system;

(d) receiving input from the user to purchase one or more items from the selected merchant;

(e) storing product selection data in response to said input from the user, wherein said product selection data identifies said one or more items from the selected merchant;

(f) repeating (a) through (e) for a plurality of different merchants, wherein until the user requests to checkout;

(g) receiving user input to checkout at a final merchant computer;

(h) transferring product selection data stored in repeated (e) for the plurality of merchants to the final merchant computer; and (i) performing checkout processing at the final merchant computer for all items selected from said plurality of different merchants.

22. The method of claim 21, wherein said storing product selection data comprises storing said product selection data in a respective merchant computer being accessed;

wherein the method further comprises transferring product selection data from a prior merchant computer to a merchant computer currently being accessed prior to said storing product selection data for the merchant computer currently being accessed;

wherein said repeating (a) through (e) for a plurality of different merchants includes repeating said transferring product selection data from a prior merchant computer to a merchant computer currently being accessed.

23. The method of claim 21, wherein said storing product selection data comprises storing said product selection data in the user computer system;

wherein said repeating steps (a) through (e) for a plurality of different merchants includes accumulating said product selection data in the user computer system for each of said plurality of different merchants.

24. The method of claim 21, wherein said storing product selection data comprises storing said product selection data in a transaction processor computer system;

wherein said repeating steps (a) through (e) for a plurality of different merchants includes accumulating said product selection data in the transaction processor computer system for each of said plurality of different merchants.

25. The method of claim 21, wherein said receiving input from the user which operates to select product information from at least one selected merchant comprises receiving input from the user which operates to select a web page of said at least one selected merchant;

wherein said transferring said product information from the merchant computer to the user computer system comprises transferring said web page to the user computer system, wherein said web page includes said product information;

wherein said displaying said product information on the display screen of the user computer system comprises displaying said web page.

26. The method of claim 21, wherein said receiving comprises receiving input from the user which operates to select a search engine for searching for one or more products;

wherein the method further comprises the search engine obtaining product information from one or more merchant computers associated with one or more merchants;

wherein said transferring includes transferring said product information from said one or more merchant computers to the user computer system;

wherein said displaying includes displaying said product information from said one or more merchant computers.

27. The method of claim 26, wherein said search engine is operable for searching for one or more products from a plurality of different merchants.

28. The method of claim 21 wherein said performing checkout processing includes transferring said product selection data to a checkout processor computer system, wherein said checkout processor computer system is operable to perform checkout processing on said items selected from said plurality of different merchants.

29. The method of claim 28, wherein said plurality of different merchants includes a first merchant and a last merchant, wherein said transferring includes a merchant computer associated with said last merchant transferring said product selection data to said checkout processor computer system.

30. The method of claim 21, wherein said performing checkout processing comprises:

receiving order information from the user;

performing review order processing for each of said plurality of different merchants;

processing the order for said plurality of different merchants.

31. The method of claim 30, wherein said performing review order processing comprises:

displaying said product selection data from said plurality of different merchants on said display screen of the user computer system;

receiving modification input from the user to modify said product selection data, wherein said modification input operates to modify the purchase of one or more items from said plurality of different merchants;

modifying said product selection data from said plurality of different vendors in response to receiving said modification input;

displaying the product selection data after said modifying.

32. The method of claim 31, wherein said performing review order processing further comprises:

calculating sales tax for each merchant indicated by said product selection data;

calculating shipping cost for each item indicated by said product selection data;

calculating a total charge for said items selected from said plurality of different merchants, wherein said total charge may include a cost for said items, said sales tax and said shipping costs;

displaying final order information on the display screen of the user computer system, wherein said final order information may include said product selection data, said sales tax, said shipping costs, a total for each merchant, and said total charge.

33. The method of claim 30, wherein said receiving order information from the user comprises:

receiving credit card information from the user; and receiving identifying information regarding the user.

34. The method of claim 30, wherein, for each of said plurality of different merchants, said processing the order comprises:

accessing a credit card network;

sending said credit card information to said credit card network;

receiving authorization information from said credit card network in response to said sending said credit card information;

determining if said order for a respective merchant is approved;

wherein said accessing, sending said credit card information, receiving authorization information, determining if said order for a respective merchant is approved, and said storing the authorization information are performed for each of said plurality of different merchants.

35. The method of claim 34, wherein said processing the order for said plurality of different merchants further comprises:

notifying said merchant of said product selection data;

providing a receipt to user.

36. The method of claim 34, wherein said receiving authorization information further comprises storing the authorization information.

37. A method for enabling a user to conduct electronic commerce in a computer network, wherein the user operates a computer system coupled to the computer network, wherein the computer system comprises a display screen and a memory, wherein the method allows a customer to purchase items from a plurality of merchants with a single checkout operation, the method comprising:

(a) receiving input from the user which operates to select product information from at least one selected first merchant, wherein a first merchant computer associated with the selected first merchant is coupled to the computer network and stores product information, wherein the first merchant computer includes a memory;

(b) transferring said product information from the first merchant computer to the user computer system;

(c) displaying said product information on the display screen of the user computer system, wherein said displaying said product information selection screen from the selected first merchant is performed in response to said transferring said product information from the first merchant computer to the user computer system;

(d) receiving product selection data from the user to purchase one or more items from the selected first merchant;

(e) storing the product selection data from the selected first merchant;

(f) receiving input from the user which operates to select product information from at least one selected second merchant, wherein a second merchant computer associated with the selected second merchant is coupled to the computer network and stores product information, wherein the second merchant computer includes a memory;

(g) transferring said product information from the second merchant computer to the user computer system;

(h) displaying said product information on the display screen of the user computer system, wherein said displaying said product information selection screen from the selected second merchant is performed in response to said transferring said product information from the second merchant computer to the user computer system;

(i) receiving product selection data from the user to purchase one or more items from the selected second merchant;

(j) storing the product selection data from the selected second merchant;

(k) receiving user input to checkout at the second merchant computer;

(l) transferring product selection data stored in said storing (e) from the selected first merchant ot the second merchant computer; and (m) performing checkout processing for all items selected from said first merchant and said second merchant at the second merchant computer.

38. A method according to claim 37, wherein said checkout processing comprises charging the user separately for each merchant from which the user purchased one or more items.

39. A method according to claim 37, wherein said checkout processing comprises allowing the user to select product selection data items from the product selection data and removing the selected product selection data items from the product selection data before said charging of said user.

40. A method according to claim 37, wherein said checkout processing comprises notifying the first and second merchant of the product selection data and providing one or more receipts to the user.

41. A method according to claim 37, wherein said storing the product selection data from the selected first merchant comprises storing said product selection to a memory area located on storing said first merchant's computer system hardware.

42. A method for processing a user purchase performed using electronic commerce in a computer network, wherein the user operates a computer system coupled to the computer network, wherein the computer system includes a display screen and a memory, wherein the user purchase includes items from a plurality of different merchants, wherein the processing requires a single checkout operation, the method comprising:

receiving product selection data from a plurality of selected merchant computers in response to receiving order information from the user to order said items;

receiving user input to checkout at the final merchant computer from said plurality of selected merchant computers;

transferring product selection data gathered from said plurality of selected merchant computers to the final merchant computer;

performing review order processing for each of said plurality of different merchants; and performing checkout processing for items selected from said plurality of selected merchant computers at the final merchant computer.

43. The method of claim 42, wherein said performing review order processing comprises:

displaying said product selection data from said plurality of different merchants on the display screen of the user computer system;

receiving modification input from the user to modify said product selection data, wherein said modification input operates to modify the purchase of one or more items from said plurality of different merchants;

modifying said product selection data from said plurality of different vendors in response to receiving said modification input; and displaying the product selection data after said modifying.

44. The method of claim 43, wherein said performing review order processing further comprises:

calculating sales tax for each item indicated by said product selection data;

calculating shipping cost for each item indicated by said product selection data;

calculating a total charge for said items selected from said plurality of different merchants, wherein said total charge includes a cost for said items, said sales tax and said shipping costs; and displaying final order information on the display screen of the user computer system, wherein said final order information includes said product selection data, said sales tax, said shipping costs and said total charge.

45. The method of claim 42, wherein said receiving order information from the user comprises:

receiving credit card information from the user; and receiving identifying information regarding the user.

46. The method of claim 42, wherein, for each of said plurality of different merchants, said processing the order comprises:

accessing a credit card network;

sending said credit card information to said credit card network;

receiving authorization information from said credit card network in response to said sending said credit card information;

determining if said order for a respective merchant is approved;

storing the authorization information if said order is approved;

wherein said accessing, sending said credit card information, receiving authorization information, determining if said order for a respective merchant is approved, and said storing the authorization information are performed for each of said plurality of different merchants.

47. A computer network system, comprising:

(a) a user computer system, including a display screen;

(b) a plurality of merchant computer systems, each including a memory area and each associated with a merchant;

(c) a network for connecting the user computer system to the plurality of merchant computer systems;

(d) means for obtaining input from a user which operates to select at least one of the plurality of merchant computer systems, (e) means for configuring the memory area in the selected merchant computer system;

(f) means for transferring product information from the selected merchant computer system to the user computer system;

(g) means for displaying the product information on the display screen of the user computer system;

(h) means for receiving user input to purchase one or more items from the selected merchant computer system;

(i) means for storing product selection data in response to the user input, wherein the product selection data identifies the items from the selected merchant computer system;

(j) means for repeating said (d) through (i) for the plurality of merchant computer systems until the user requests to checkout at a final merchant computer system;

(k) means for receiving user input to checkout at the final merchant computer system;

(l) means for transferring the product selection data stored in repeated (i) for the plurality of merchants to the final merchant computer system; and (m) means for performing checkout processing for items selected from said plurality of merchant computer systems at the final merchant computer system.

48. The network computer system of claim 47 wherein the means for combining comprises means for transferring selection data from the memory area of the first merchant computer system to the memory area of the second merchant computer system.

49. The network computer system of claim 47, wherein the means for receiving input includes means for receiving input from the user which operates to select a web page of the selected merchant computer system;

wherein the means for transferring the product information from the merchant computer system to the user computer system comprises means for transferring the web page to the user computer system, wherein the web page includes said product information;

wherein the means for displaying the product information includes means for displaying the web page.

50. The network computer system of claim 47, wherein the means for receiving input from the user includes means for receiving input from the user which operates to select a search engine comprising means for searching for one or more products;

wherein the means for searching for one or more products further includes means for the search engine to obtain product information from one or more merchant computers systems;

wherein the means for transferring the product information from the merchant computer system to the user computer system includes means for transferring the product information from the plurality of merchant computer systems to the user computer system; and wherein the means for displaying the product information on the display screen of the user computer system comprises means for displaying the product information from the plurality of merchant computers systems.

51. The network computer system of claim 47, wherein the means for performing checkout processing for items selected from the plurality of different merchants includes means for transferring the product selection data to a checkout processor computer system, wherein the checkout processor computer system performs checkout processing on the items selected from the plurality of different merchants.

52. The network computer system of claim 47, wherein the means for performing checkout processing for items selected from the plurality of different merchants computer systems comprises:

means for receiving order information from the user computer system;

means for performing review order processing for the combination of selection data; and means for processing the order for the combination of selection data.

53. The network computer system of claim 47, wherein, for each of the plurality of different merchants, the means for processing the order comprises:

means for accessing a credit card network for each of the plurality of different merchants;

means for sending credit card information to the credit card network for each of the plurality of different merchants;

means for receiving authorization information from the credit card network for each of the plurality of different merchants;

means for determining if the order for a respective merchant is approved for each of the plurality of different merchants; and means for storing the authorization information approved for each of the plurality of different merchants.

54. A computer readable medium for enabling a user to conduct electronic commerce in a computer network, the computer network comprising:

(a) means for obtaining input from the user which operates to select at least one of a plurality of merchant computer systems, (b) means for configuring a memory area in a selected merchant computer system for storage of product selection data;

(c) means for transferring product information from the selected merchant computer system to a user computer system;

(d) means for displaying the product information on a display screen of the user computer system;

(e) means for receiving user input to purchase one or more items from the selected merchant computer system;

(f) means for storing product selection data in response to the input from the user, wherein the product selection data identifies the items from the selected merchant computer system;

(g) means for repeating said (a) through (f) for the plurality of merchant computer systems until the user requests to checkout at a final merchant computer system;

(h) means for receiving user input to checkout at the final merchant computer system;

(i) means for transferring the product selection data stored in repeated (f) for the plurality of merchant computer systems to the final merchant computer system; and (j) means for performing checkout processing for items selected from said plurality of merchant computer systems at the final merchant computer system.

55. The computer readable medium of claim 54 wherein the means for combining comprises means for transferring selection data from a first merchant computer system memory area to a second merchant computer system memory area.

56. The computer readable medium of claim 54, wherein the means for receiving input from the user to purchase one or more items from the selected merchant computer system comprises means for receiving input from the user which operates to select a web page of the selected merchant computer system;

wherein the means for transferring the product information from the merchant computer system to the user computer system comprises means for transferring the web page to the user computer system, wherein the web page includes said product information; and wherein the means for displaying the product information on the display screen of the user computer system comprises means for displaying the web page.

57. The computer readable medium of claim 54, wherein the means for receiving input from the user which operates to select product information from at least one selected merchant computer system comprises means for receiving input from the user which operates to select a search engine comprising means for searching for one or more products;

wherein the means for searching for one or more products further comprises means for the search engine obtaining product information from one or more merchant computers systems;

wherein the means for transferring the product information from the merchant computer system to the user computer system includes means for transferring the product information from the plurality of merchant computer systems to the user computer system; and wherein the means for displaying the product information on the display screen of the user computer system comprises means for displaying the product information from the plurality of merchant computers systems.

58. The computer readable medium of claim 54, wherein the means for performing checkout processing for items selected from the plurality of different merchants includes means for transferring the product selection data to a checkout processor computer system, wherein the checkout processor computer system performs checkout processing on the items selected from the plurality of different merchants.

59. The computer readable medium of claim 54, wherein the means for performing checkout processing for items selected from the plurality of different merchants computer systems comprises:

means for receiving order information from the user computer system;

means for performing review order processing for the combination of selection data; and means for processing the order for the combination of selection data.

60. The computer readable medium of claim 54, wherein, for each of the plurality of different merchants, the means for processing the order comprises:

means for accessing a credit card network for each of the plurality of different merchants;

means for sending credit card information to the credit card network for each of the plurality of different merchants;

means for receiving authorization information from the credit card network for each of the plurality of different merchants;

means for determining if the order for a respective merchant is approved for each of the plurality of different merchants; and means for storing the authorization information approved for each of the plurality of different merchants.

\* \* \* \* \*